(12) United States Patent
Capdepon et al.

(10) Patent No.: US 10,688,838 B2
(45) Date of Patent: Jun. 23, 2020

(54) ELECTRONIC MODULE HOUSING AND ELECTRONIC UNIT FOR MEASURING OPERATING PARAMETERS OF A VEHICLE WHEEL

(71) Applicants: Continental Automotive France, Toulouse (FR); Continental Automotive GmbH, Hannover (DE)

(72) Inventors: Gilles Capdepon, Vernet (FR); Frédéric Gaugain, Leguevin (FR); Olivier Gout, Cugnaux (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 97 days.

(21) Appl. No.: 16/074,133

(22) PCT Filed: Aug. 26, 2016

(86) PCT No.: PCT/EP2016/001439
§ 371 (c)(1),
(2) Date: Jul. 31, 2018

(87) PCT Pub. No.: WO2017/144073
PCT Pub. Date: Aug. 31, 2017

(65) Prior Publication Data
US 2020/0009926 A1 Jan. 9, 2020

Related U.S. Application Data

(60) Provisional application No. 62/298,597, filed on Feb. 23, 2016.

(30) Foreign Application Priority Data

Feb. 25, 2016 (FR) ...................................... 16 51551

(51) Int. Cl.
*B60C 23/04* (2006.01)

(52) U.S. Cl.
CPC ................................ *B60C 23/0494* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 4,411,302 A * 10/1983 Kuypers ................. B60C 29/02
137/223
2005/0087228 A1 * 4/2005 Uleski ................. B60C 23/0408
137/223

(Continued)

FOREIGN PATENT DOCUMENTS

| CN | 204123906 U | 1/2015 |
|---|---|---|
| EP | 0985560 A2 | 3/2000 |

(Continued)

OTHER PUBLICATIONS

International Search Report and Written Opinion for International Application No. PCT/EP2016/001439, dated Nov. 15, 2016—8 pages.

(Continued)

*Primary Examiner* — Andre J Allen
(74) *Attorney, Agent, or Firm* — RatnerPrestia

(57) ABSTRACT

A housing for an electronic module for an electronic unit for measuring operating parameters of the wheel of a vehicle which is able to collaborate with a "snap-in" type inflation valve, including a valve body made of an elastomer material, provided with a longitudinal axial bore and intended to extend through an orifice made in a rim, and a hollow tubular core made of a rigid material. A front face of the electronic module housing being connected to the inflation valve using (Continued)

a connecting device. The electronic module is configured to prevent the electronic module from pivoting about an axis defined by the housing connecting device.

19 Claims, 4 Drawing Sheets

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 23/0493; B60C 19/00; B60C 23/04; B60C 23/0498; B60C 23/064; B60C 23/0488; B60C 23/0496; B60C 23/0408; B60C 23/041; B60C 23/0411; B60C 23/20; B60C 23/0486; B60C 23/06; B60C 11/243; B60C 11/246; B60C 23/061; B60C 99/00; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/0022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0457; B60C 23/0462; B60C 23/0467; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 2005/0087229 A1* | 4/2005 | Uleski | B60C 23/0408 137/223 |
| 2006/0272758 A1* | 12/2006 | Yin | B60C 23/0408 152/427 |
| 2007/0062268 A1 | 3/2007 | Blossfeld et al. | |
| 2008/0127724 A1* | 6/2008 | Qiu | B60C 23/0494 73/146.8 |
| 2010/0024539 A1* | 2/2010 | Hamm | B60C 23/0408 73/146.5 |
| 2014/0311233 A1* | 10/2014 | Yu | B60C 23/0494 73/146.8 |
| 2015/0000763 A1* | 1/2015 | Recker | F16K 15/202 137/223 |
| 2015/0136244 A1 | 5/2015 | Kempf | |
| 2015/0273957 A1 | 10/2015 | Kempf | |
| 2018/0339561 A1* | 11/2018 | Sugino | B60C 29/02 |

FOREIGN PATENT DOCUMENTS

| | | |
|---|---|---|
| EP | 1661736 A2 | 5/2006 |
| WO | 2013153134 A1 | 10/2013 |

OTHER PUBLICATIONS

Chinese Office Action for Chinese Application No. 201680082431.4 dated Nov. 4, 2019, 8 pages.

\* cited by examiner

ELECTRONIC MODULE HOUSING AND ELECTRONIC UNIT FOR MEASURING OPERATING PARAMETERS OF A VEHICLE WHEEL

CROSS REFERENCE TO RELATED APPLICATIONS

This application is the U.S. National Phase Application of PCT/EP2016/001439, filed Aug. 26, 2016, which claim priority to U.S. Provisional Application No. 62/298,597, filed Feb. 23, 2016 and French Patent Application No. 1651551, filed Feb. 25, 2016, the contents of such applications being incorporated by reference herein.

FIELD OF THE INVENTION

The present invention relates to a housing for an electronic module for an electronic unit for measuring operating parameters of a vehicle wheel. It also relates to an electronic unit comprising such an electronic module housing and an inflation valve.

BACKGROUND OF THE INVENTION

Motor vehicles are increasingly being fitted with systems for monitoring and/or measuring parameters, comprising sensors.

By way of example of such systems, mention may be made of the tire pressure monitoring systems that comprise electronic modules mounted on each of the wheels of vehicles, these being dedicated to measuring parameters, such as pressure and/or temperature of the tires with which these wheels are fitted, and intended to inform the driver of any abnormal variation in the measured parameter.

One of the current solutions most commonly used for attaching the electronic modules to the wheel rims is to make electronic units each made up of an electronic module assembled with an inflation valve that allows said electronic module to be secured to the rim of the wheel.

One solution regarding such electronic units is to produce special-purpose inflation valves designed for transmitting the loads to which the electronic modules are subjected. However, this solution proves expensive because, in addition to the high price of the inflation valves, which are generally all-metal, it entails the production of ancillary components (nuts, seals, . . . ) which are especially designed to ensure airtight attachment of the inflation valves to the rims.

With a view to alleviating this disadvantage, a second solution is to produce inflation valves made of elastomer material, having the same basic design as the conventional "snap-in" inflation valves, but modified in order to be able to absorb the forces to which the electronic modules are subjected.

This solution has notably resulted in the creation of an electronic unit comprising:
an electronic module,
an inflation valve of the "snap-in" type, comprising:
  a valve body made of an elastomer material, provided with a longitudinal axial bore and intended to extend through an orifice made in the rim, said valve body being made up of an elastically deformable trunk and of an abutment head for butting against the rim, which head is separated from the trunk by a neck designed to become positioned in airtight manner in the orifice made in said rim,
  and a hollow tubular core made of a rigid material, housing a shut-off mechanism and of dimensions suited to being housed in the bore of the valve body and to extending on each side in the continuation of said valve body, said tubular core being made up of two longitudinal portions arranged with respect to one another and relative to the valve body in such a way as to allow the trunk elastic deformation suited to allowing the inflation valve to be mounted through the orifice in the rim,
and means of joining the electronic module and the inflation valve.

Because of these specific features and, in practice, such an electronic unit has the advantage of guaranteeing that the inflation valve will behave in a similar way to a traditional "snap-in" type of inflation valve. In particular, this inflation valve of the "snap-in" type eliminates the need for a nut to hold the tire parameter monitoring electronic unit in position on the wheel rim on which it is mounted, and this is an advantage because it simplifies the installation of said electronic unit.

However, when the vehicle is moving at high speed, stressing forces are applied to the tire valve. These relatively high forces may lead to deformation of the body of said valve which is made of an elastomer material, and this may cause air with which the tire is inflated to escape.

These forces notably increase with the mass of the tire parameter monitoring electronic module.

The electronic modules are generally made up of a housing containing the control electronics for these electronic units. The housings generally have an elongate shape and enclose, on the one hand, a printed circuit or "PCB" comprising the control electronics for the electronic unit and, on the other hand, a battery power supply, said printed circuit and said battery being arranged in the one same plane. The disadvantage of such electronic modules is that they have a high weight giving rise to a significant imbalance phenomenon, notably when the vehicle is moving at high speed, and this leads to an appreciable reduction in the dynamic performance of such electronic units.

In order to alleviate these disadvantages, a more compact housing in which the printed circuit and the battery are arranged not coplanar but parallel, one above the other, or alternatively not coplanar but perpendicular to one another has been proposed (see notably document WO 2013153134, incorporated by reference herein). These arrangements make it possible to reduce the mass of the electronic module and, therefore, to increase the dynamic performance of the electronic units, thus reducing the stresses applied to the valve body.

However, before the tire is mounted on the wheel rim an optimization step better known as "matching" is generally carried out and involves rotating the tire on the rim in order to optimize the position of the imbalance of said tire in relation to that of the rim, before the wheel is balanced, so as to lessen the effects of irregularities in the shape of the tire and of the rim.

Now, during this operation of "matching" a tire to a rim of a wheel fitted with an electronic tire parameter monitoring unit, said tire may come into contact with the electronic unit with which said rim is fitted and, because of the compact shape of the electronic module and because of the ability of the "snap-in" valve body made of elastomer to deform, it may apply torsional and translational loadings to the electronic unit such that it is made to pivot about the longitudinal axis of the means joining the electronic module and the inflation valve together.

This defective positioning of the electronic unit leads to incorrect operation of said electronic unit. Specifically, the electronic module of the electronic unit notably comprises electronic components the operation of which is dependent on their positioning. For example, the electronic unit comprises a sensor for measuring the radial acceleration of the wheel, such as an accelerometer, the measurements of which are exploited in target applications, notably:

automatic learning by the sensors or the monitoring of the position of the sensors themselves;

location of the wheels in order to monitor the tire pressure corresponding to each wheel located, detection of tire overload and tire wear, requiring accurate positioning of the radial acceleration sensor and, therefore, of the electronic module, with respect to the rim of the wheel.

The electronic module of the electronic unit further comprises a radiofrequency (RF) emitter and an LF (Low Frequency) antenna, so as to be able to communicate with a central electronic unit (mounted on the vehicle) for receiving signals emitted by the emitters of each electronic module with which the wheels of said vehicle are equipped. Hence, poor positioning of the electronic module leads to poor RF communication between the electronic units with which the wheels of the vehicle are equipped and the central electronic unit of said vehicle.

In addition, this poor positioning of the electronic unit may lead to damage, such as the pulling-out of said electronic unit during operations of fitting, removing, or inflating the tire.

Thus, a pivoting of the electronic unit with respect to the rim of the wheel on which it is mounted is therefore to be avoided.

At the present time, in order to overcome this problem, it is proposed that a visual check be performed of each wheel, during the operation of "matching" the tire to the rim, in order to set aside products exhibiting an electronic unit that has pivoted. In addition, a manual intervention is needed on each defective product in order to correctly reposition the electronic unit with respect to the rim of the wheel on which it is mounted. This human intervention to check and correct the positioning of the electronic units during the operation of "matching" the tires to the rims of the wheels leads to a very significant additional cost.

SUMMARY OF THE INVENTION

An aspect of the present invention is an electronic module housing and an electronic unit for measuring the operating parameters of a wheel of a vehicle, comprising such an electronic module housing and an inflation valve, which are free of the aforementioned disadvantages.

According to an aspect of the invention, this is achieved by virtue of a housing for an electronic module for an electronic unit for measuring operating parameters of a wheel of a vehicle which is able to collaborate with a "snap-in" type of inflation valve, comprising:

a valve body made of an elastomer material, provided with a longitudinal axial bore and intended to extend through an orifice made in a rim, said valve body being made up of an elastically deformable trunk and of an abutment head for butting against the rim, which head is separated from the trunk by a neck designed to become positioned in airtight manner in the orifice made in said rim, and a hollow tubular core made of a rigid material, housing a shut-off mechanism and of dimensions suited to being housed in the bore of the valve body and to extending on each side in the continuation of said valve body, said tubular core being made up of two longitudinal portions arranged with respect to one another and relative to the valve body in such a way as to allow the trunk elastic deformation suited to allowing the inflation valve to be mounted through the orifice in the rim, one face, referred to as the front face, of the electronic module housing being connected to the inflation valve using connecting means, notable in that it comprises means configured to prevent the electronic module from pivoting about an axis defined by said connecting means.

The housing for an electronic module for an electronic unit according to an aspect of the invention affords several beneficial advantages. In particular, it makes it possible to guarantee that the electronic unit will not pivot during the mounting of the tire on the rim of a wheel, thus making it possible to omit the costly visual check and manual repositioning, while at the same time offering a solution that is compact so as to preserve the dynamic performance and, therefore, the mechanical integrity, of the electronic unit.

According to one preferred and advantageous exemplary embodiment, the means that prevent the pivoting of the electronic module comprise:

means for blocking the rotation of the electronic module which are able to collaborate with the rim of the wheel intended to accept the electronic unit;

means for pressing against the electronic module which are able to collaborate with the rim and the tire of the wheel intended to accept the electronic unit.

In that way, an opposing force countering the stresses inflicted by the tire on the electronic module during the "matching" operation is obtained:

by creating an abutment of the housing against the rim in order to limit the translational movement of the unit carried along by the rotational movement as it comes into contact with the tire;

by creating a squeezing or trapping of the housing between the tire and the rim and by pressing said housing against the rim in such a way as to definitively prevent the electronic unit from lifting.

According to one exemplary embodiment, the means for blocking the rotation of the electronic module consists of a widening of said housing at least in its portion on the side of the front face able to be positioned facing the inflation valve, and the means for pressing against the electronic module consists of a chamfered or rounded shape of said housing in the direction of its portion on the side of the rear face.

According to one exemplary embodiment, the means for blocking rotation and the means for pressing against the electronic module consist of tabs extending from the corners of the lower edge of said housing, which is able to be positioned facing the rim.

According to one advantageous exemplary embodiment, the means for blocking rotation and the means for pressing against the electronic module consist of a ledge extending from the lower edge of said housing.

This embodiment offers the advantage of being robust.

According to one preferred exemplary embodiment, the width of the ledge extending from the lower edge of the front face of said housing is less than the width of the ledge extending from the lower edge of the other faces of said housing.

According to another embodiment, the width of the ledge extending from the lower edge of the front face of said housing is zero.

According to one exemplary embodiment, the walls of said housing or the ledge extending from the lower edge of each face of said housing are sloped.

This feature makes it possible to reduce or even eliminate the point of snagging on the tire, allowing the latter to ride up more easily over the housing and press the latter firmly against the rim.

According to one advantageous exemplary embodiment, the ledge extending laterally from the lower edge of the lateral faces of said housing has a width that decreases in the direction of the rear face of said housing.

This feature offers the advantage of further reducing the weight and therefore the cost of the housing, and also of improving the dynamic performance thereof.

According to one preferred and advantageous exemplary embodiment:

the means for blocking the rotation of the electronic module consists of a ledge extending laterally from the lower edge of the lateral faces of said housing and having a width that decreases in the direction of the rear face of said housing forming tabs near the front face of the housing;

the means for pressing against the electronic module consist of the portion of ledge extending from the lower edge of the rear face of said housing.

An aspect of the present invention also relates to an electronic module for an electronic unit for measuring operating parameters of a vehicle wheel, notable in that it comprises a housing exhibiting any one of the aforementioned features, said housing enclosing, on the one hand, a printed circuit comprising the control electronics for the electronic unit and, on the other hand, a battery power supply, said printed circuit and said battery being arranged not coplanar but parallel, one above the other, or alternatively not coplanar but perpendicular to one another.

An aspect of the present invention also relates to an electronic unit for measuring operating parameters of a vehicle wheel, notable in that it comprises:

an electronic module according to an aspect of the invention, an inflation valve of the "snap-in" type, comprising:

a valve body made of an elastomer material, provided with a longitudinal axial bore and intended to extend through an orifice made in the rim, said valve body being made up of an elastically deformable trunk and of an abutment head for butting against the rim, which head is separated from the trunk by a neck designed to become positioned in airtight manner in the orifice made in said rim, and a hollow tubular core made of a rigid material, housing a shut-off mechanism and of dimensions suited to being housed in the bore of the valve body and to extending on each side in the continuation of said valve body, said tubular core being made up of two longitudinal portions arranged with respect to one another and relative to the valve body in such a way as to allow the trunk elastic deformation suited to allowing the inflation valve to be mounted through the orifice in the rim, and means of joining the electronic module and the inflation valve.

An aspect of the present invention also relates to a vehicle wheel comprising a rim and a tire able to cover said rim in such a way as to delimit a chamber to accommodate the air with which said tire is inflated, notable in that it is equipped with an electronic unit according to an aspect of the invention.

BRIEF DESCRIPTION OF THE DRAWING

Other aspects, features and advantages of the present invention will become apparent from the following description, provided by way of entirely non-limiting example with reference to the appended drawings, in which.

DETAILED DESCRIPTION OF THE PREFERRED EMBODIMENTS

Figure 1:
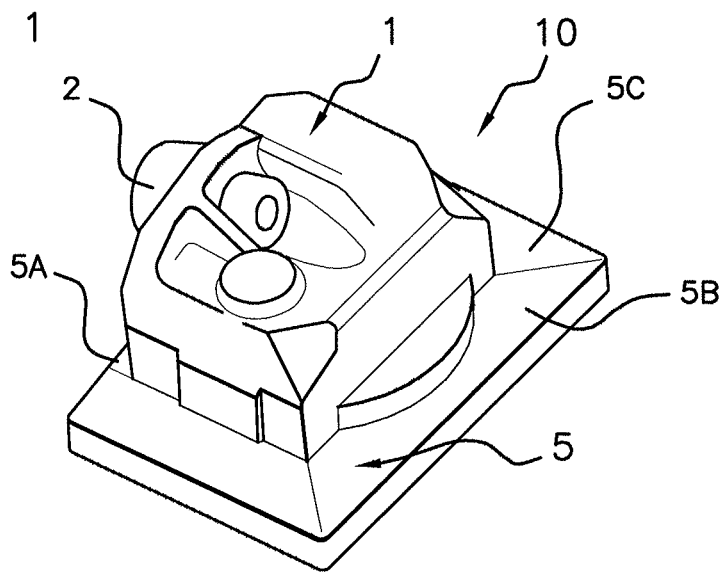
FIG. 1 is a perspective view of a first exemplary embodiment of the electronic module housing for an electronic unit according to an aspect of the invention.
Figure 2:
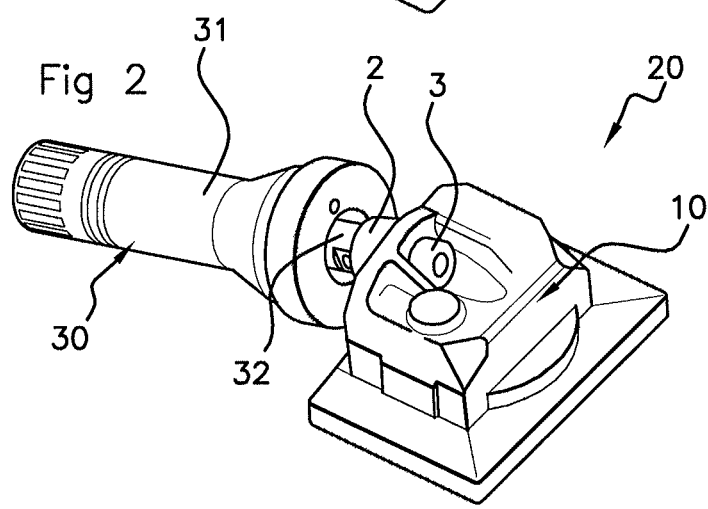
FIG. 2 is a perspective view illustrating an electronic unit comprising a "snap-in" type of valve and an electronic module comprising a housing according to the embodiment of FIG. 1.
Figure 3:
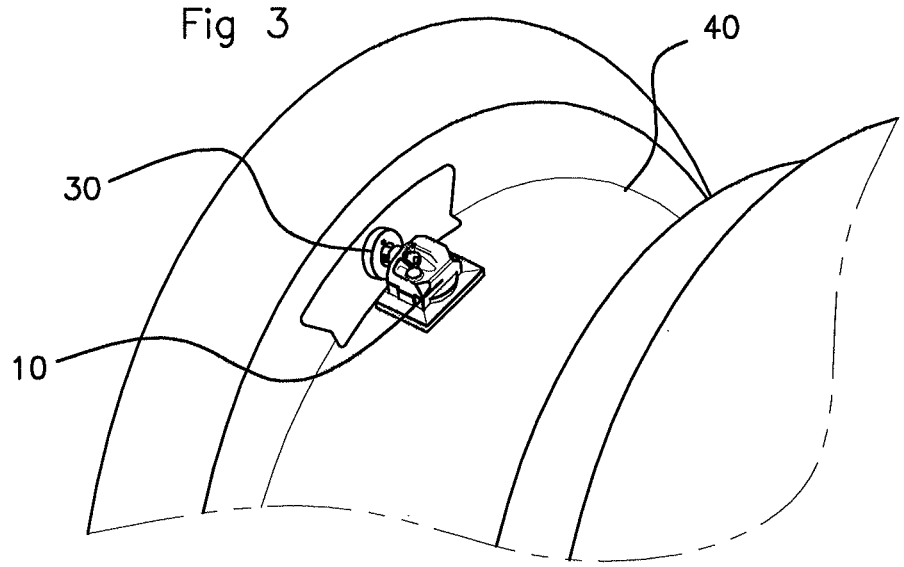
FIG. 3 is a perspective view illustrating an electronic unit according to FIG. 2 mounted on a rim (depicted in part), in a rest position.
Figure 4:
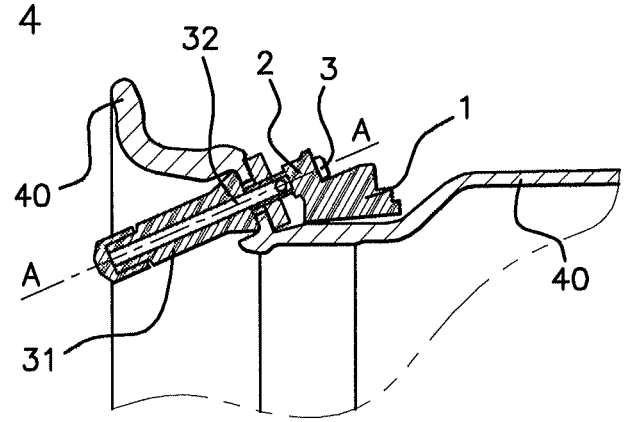
FIG. 4 is a view, in cross section on the plane passing through the axis of the valve and the axis of the rim of FIG. 3, of the electronic unit, the latter being at rest.
Figure 5:
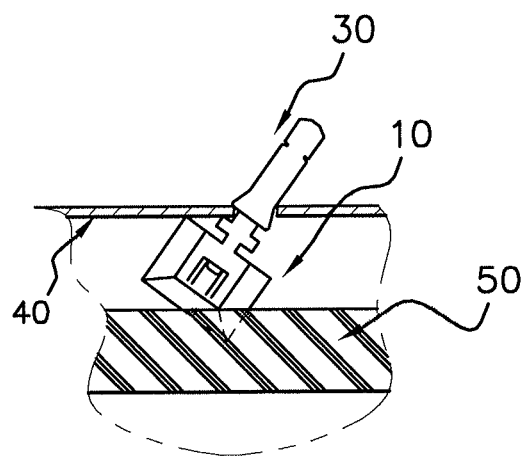
FIG. 5 is a plan view illustrating the electronic unit subjected to the stresses of a tire as the latter is being mounted on the rim.
Figure 6:
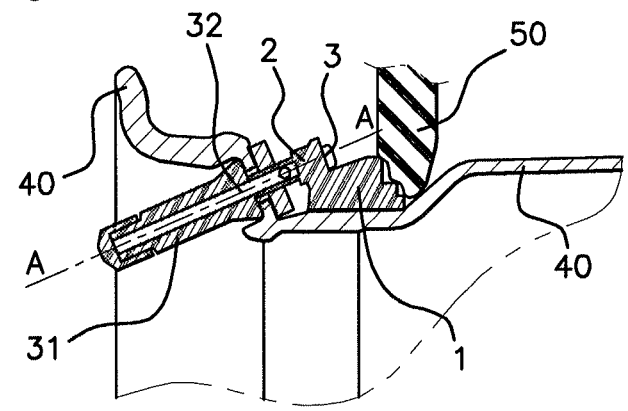
FIG. 6 is a view similar to FIG. 4, with the electronic unit subjected to the stresses of a tire as the latter is being mounted on the rim.
Figure 7:
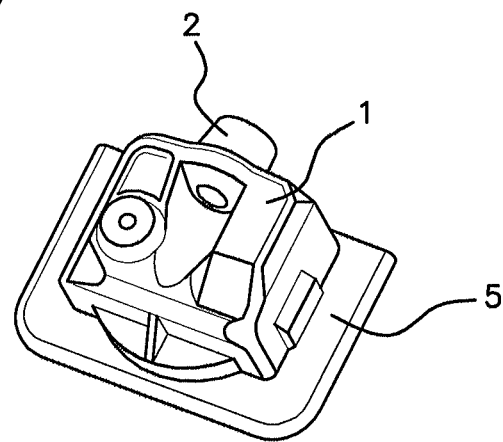
FIG. 7 is a perspective view illustrating a second exemplary embodiment of the electronic module housing for an electronic unit according to an aspect of the invention.

In this description and in the claims, the terms "front" and "rear" are used with reference to the electronic module housing of an electronic unit comprising an inflation valve, the face referred to as the "front" face of said housing being the face intended to be positioned facing the electronic module housing when said electronic module and said inflation valve are joined together, and the face referred to as the "rear" face being the opposite face to the face referred to as the "front" face. The terms "upper" and "lower" are used with reference to the electronic module housing of an electronic module when the latter is mounted on a wheel rim, the face referred to as the "lower" face of said housing being the one intended to face said rim.

The housing 1 of an electronic module 10 for an electronic unit 20 for measuring operating parameters of a wheel of a vehicle according to an aspect of the invention is able to collaborate with a "snap-in" type of inflation valve 30.

In the way known per se, "snap-in" inflation valves 30 comprise:

a valve body 31 made of an elastomer material, provided with a longitudinal axial bore and intended to extend through an orifice made in a rim 40, said valve body 31 being made up of an elastically deformable trunk and of an abutment head for butting against the rim, which head is separated from the trunk by a neck designed to become positioned in airtight manner in the orifice made in said rim 40, and a hollow tubular core 32 made of a rigid material, housing a shut-off mechanism and of dimensions suited to being housed in the bore of the valve body 31 and to extending on each side in the continuation of said valve body 31, said tubular core 32 being made up of two longitudinal portions arranged with respect to one another and relative to the valve body 31 in such a way as to allow the trunk elastic deformation suited to allowing the inflation valve 30 to be mounted through the orifice in the rim 40.

The face referred to as the "front" face of the housing 1 of the electronic module 10 and the inflation valve 30 are configured in the way known per se so that they can be joined together rigidly using connecting means. For example, a continuation of the hollow tubular core 32 of the inflation valve 30 collaborates with a sleeve 2 with which the housing 1 is equipped and which projects from the front face of said housing 1. The housing 1 for the electronic module 10 and the inflation valve 30 then being fixed together using a screw 3.

The housing 1 according to an aspect of the invention comprises means configured to prevent the electronic module 10 from pivoting about an axis A-A defined by said joining means 2-3-32 when said electronic module 10 is subjected to the stresses of a tire 50, for example when said tire is being positioned and rotated on the rim 40 during a "matching" operation. In particular, the housing 1 according to an aspect of the invention comprises means configured for preventing the electronic module from pivoting about the axis A-A of the joining sleeve 2 of the housing 1.

For preference and advantageously, the means preventing the pivoting of the electronic module 10 about the axis A-A comprise:

means blocking the rotation of the electronic module 10 which are able to collaborate with the rim 40 of the wheel intended to accept the electronic unit 20;

means pressing against the electronic module 10 which are able to collaborate with the rim 40 and the tire 50 of the wheel intended to accept the electronic unit 20.

Figure 10:
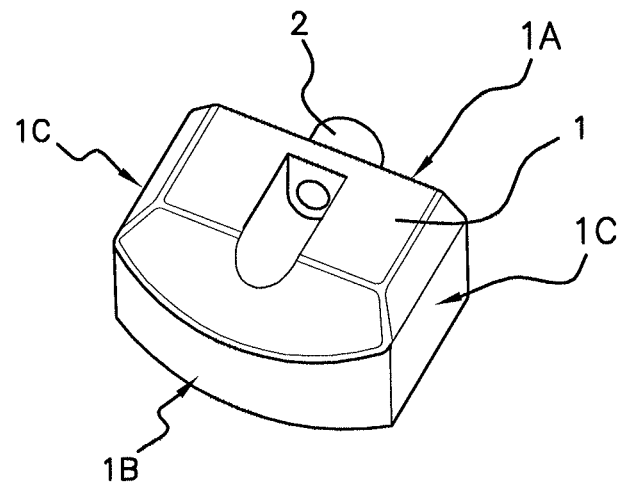
FIG. 10 is a perspective view illustrating a fifth exemplary embodiment of the electronic module housing for an electronic unit according to an aspect of the invention.
Figure 11:
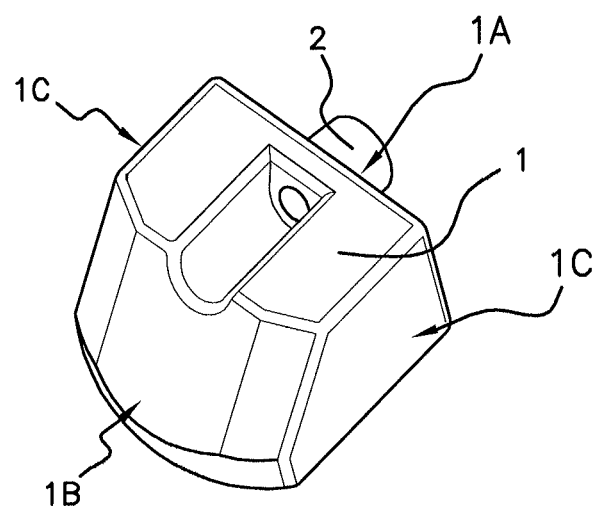
FIG. 11 is a perspective view illustrating a sixth exemplary embodiment of the electronic module housing for an electronic unit according to an aspect of the invention.

According to the exemplary embodiments illustrated in FIGS. 10 and 11, the means blocking the rotation of the electronic module 10 consist of a widening of said housing 1 at least in its portion on the side of the front face 1A able to be positioned facing the inflation valve 30, this widened shape allowing the housing 1 to come into abutment quickly against the rim 40 as it is carried along in rotation by a tire 50, and the means for pressing against the electronic module 10 consist of a chamfered or rounded shape of said housing 1 in the direction of its portion on the side of the rear face 1B, this chamfered shape having the effect of reducing the snagging point in the event of contact with a tire 50 and of allowing said tire 50 to ride up over the housing 1 of the electronic module 10 so as to press the latter against the rim 40. According to another embodiment, the housing 1 has a rounded shape, this rounded shape having the effect of reducing the snagging point in the event of contact with a tire 50 and of allowing said tire 50 to ride up over the housing 1 of the electronic module 10 so as to press the latter against the rim 40.

According to another advantageous exemplary embodiment, the walls or faces 1A, 1B, 1C of the housing 1 are sloped so as to give said housing 1 the shape of a truncated pyramid. This feature makes it possible to reduce or even eliminate the point of snagging of the electronic module 10 on the tire 50, allowing the latter to ride up more easily over the housing 1 of the electronic module 10 and press the latter firmly against the rim 40. For preference, only the rear wall 1B and the lateral wall 1C of the housing 1 have such a slope.

Figure 9:
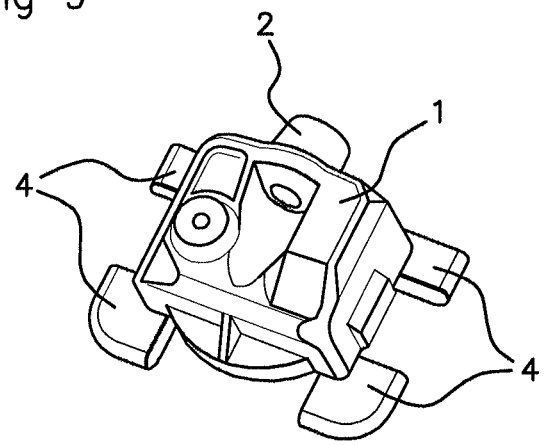
FIG. 9 is a perspective view illustrating a fourth exemplary embodiment of the electronic module housing for an electronic unit according to an aspect of the invention.

According to one exemplary embodiment, illustrated in FIG. 9, the means for blocking rotation and the means for pressing against the electronic module 10 consist of tabs or lugs 4 extending from the corners of the lower edge of said housing 1, which is able to be positioned facing the rim 40 when the electronic unit 20 is being mounted on the rim 40.

FIGS. 1 to 7 illustrate preferred and advantageous embodiments.

In these embodiments, the means for blocking rotation and the means for pressing against the electronic module consist of a ledge 5 extending from the lower edge of said housing 1. This embodiment offers the advantage of being robust. It also allows the creation of a skirt around the electronic module 1 making it possible to conceal a region of laser welding of a cover placed on the underside of the housing 1, on the electronic module, which is sometimes visually unattractive.

For preference and advantageously, the width of the ledge 5A extending from the lower edge of the front face 1A of said housing 1 is less than the width of the ledge 5B, 5C extending from the lower edge of the other, rear 1B and lateral 1C, faces of said housing 1. For example, the width of the ledge 5A extending from the lower edge of the front face 1A of said housing 1 is zero.

According to the exemplary embodiment illustrated in FIG. 1, the ledge 5 extending from the lower edge of each face of said housing 1 is sloped so as to form a base in the shape of a truncated pyramid. This feature makes it possible to reduce or even eliminate the point of snagging of the electronic module 10 on the tire 50, allowing the latter to ride up more easily over the housing 1 of the electronic module 10 and press the latter firmly against the rim 40. For preference and advantageously, the ledge 5C extending laterally from the lower edge of the lateral faces 1C of said housing 1 has a width that decreases in the direction of the rear face 1B of said housing 1. This feature offers the advantage of further reducing the weight and therefore the cost of the housing 1, and also of improving the dynamic performance thereof.

Figure 8:
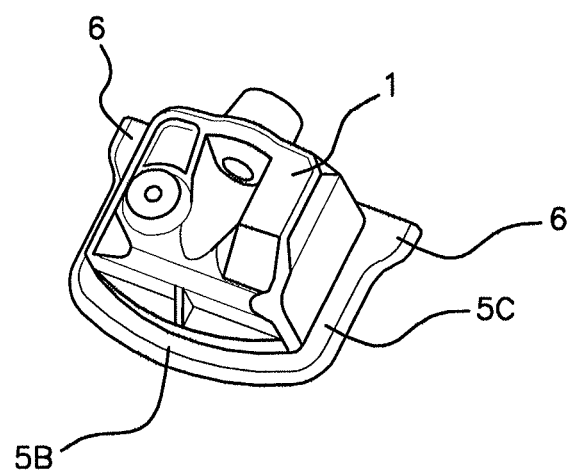
FIG. 8 is a perspective view illustrating a third exemplary embodiment of the electronic module housing for an electronic unit according to an aspect of the invention.

According to the preferred and advantageous exemplary embodiment illustrated in FIG. 8:

the means for blocking the rotation of the electronic module 10 consists of a ledge 5C extending laterally from the lower edge of the lateral faces 1C of said housing 1 and having a width that decreases in the direction of the rear face 1B of said housing 1, thus forming tabs 6 near the front face 1A of the housing 1;

the means for pressing against the electronic module 10 consist of the portion of ledge 5B extending from the lower edge of the rear face 1B of said housing 1, which is able to be positioned facing the rim 40 when the electronic unit 20 is being mounted on the rim 40.

The housing 1 according to an aspect of the invention is produced using any known technique, for example molding. According to one exemplary embodiment, the means for blocking rotation and the means for pressing against the electronic module 10 are produced by extrusion from the housing 1 or from the cover of said housing 1 which is arranged on the underside thereof.

An aspect of the present invention also relates to an electronic module 10 for an electronic unit 20 for measuring operating parameters of a vehicle wheel, notable in that it comprises a housing 1 exhibiting any one of the aforementioned features, said housing 1 enclosing, on the one hand, a printed circuit comprising the control electronics for the electronic unit 20 and, on the other hand, a battery power supply, said printed circuit and said battery being arranged not coplanar but parallel, one above the other, or alternatively not coplanar but perpendicular to one another.

An aspect of the present invention also relates to an electronic unit 20 for measuring operating parameters of a vehicle wheel, notable in that it comprises:
- an electronic module 10 according to an aspect of the invention,
- an inflation valve 30 of the "snap-in" type, comprising:
  - a valve body 31 made of an elastomer material, provided with a longitudinal axial bore and intended to extend through an orifice made in the rim 40, said valve body being made up of an elastically deformable trunk and of an abutment head for butting against the rim 40, which head is separated from the trunk by a neck designed to become positioned in airtight manner in the orifice made in said rim 40,
  - and a hollow tubular core 32 made of a rigid material, housing a shut-off mechanism and of dimensions suited to being housed in the bore of the valve body 31 and to extending on each side in the continuation of said valve body 31, said tubular core 32 being made up of two longitudinal portions arranged with respect to one another and relative to the valve body 31 in such a way as to allow the trunk elastic deformation suited to allowing the inflation valve 30 to be mounted through the orifice in the rim 40,
- and means 2-3-32 of joining the electronic module 10 according to an aspect of the invention and the inflation valve 30.

An aspect of the present invention also relates to a vehicle wheel comprising a rim 40 and a tire 50 able to cover said rim 40 in such a way as to delimit a chamber to accommodate the air with which said tire 50 is inflated, notable in that it is equipped with an electronic unit 20 according to an aspect of the invention.

The invention claimed is:

1. A housing for an electronic module for an electronic unit for measuring operating parameters of the wheel of a vehicle which is able to collaborate with a "snap-in" type inflation valve, comprising:
    a valve body made of an elastomer material, provided with a longitudinal axial bore to extend through an orifice made in a rim, said valve body being made up of an elastically deformable trunk and of an abutment head for butting against the rim, which head is separated from the trunk by a neck adapted to become positioned in an airtight manner in the orifice made in said rim, and
    a hollow tubular core made of a rigid material, housing a shut-off mechanism and of dimensions suited to being housed in the bore of the valve body and extending on each side in the continuation of said valve body, said tubular core being made up of two longitudinal portions arranged with respect to one another and relative to the valve body in such a way as to allow the trunk elastic deformation suited to allowing the inflation valve to be mounted through the orifice in the rim,
    a front face of the electronic module housing being connected to the inflation valve using connecting means, wherein the electronic module comprises means configured to prevent the electronic module from pivoting about an axis defined by said housing connecting means.

2. The housing for an electronic module as claimed in claim 1, wherein the means preventing the electronic module from pivoting comprise:
    means for blocking the rotation of the electronic module which are able to collaborate with the rim of the wheel intended to accept the electronic unit;
    means for pressing against the electronic module which are able to collaborate with the rim and the tire of the wheel intended to accept the electronic unit.

3. The housing for an electronic module as claimed in claim 1 wherein the means for blocking the rotation of the electronic module comprises a widening of said housing at least in its portion on the side of the front face able to be positioned facing the inflation valve, and the means for pressing against the electronic module comprises a chamfered or rounded shape of said housing in the direction of its portion on the side of the rear face.

4. The housing for an electronic module as claimed in claim 1, wherein the means for blocking rotation and the means for pressing against the electronic module comprises tabs extending from the corners of a lower edge of said housing, which is able to be positioned facing the rim.

5. The housing for an electronic module as claimed in claim 1, wherein the means for blocking rotation and the means for pressing against the electronic module comprises a ledge extending from a lower edge of said housing.

6. The housing for an electronic module as claimed in claim 5, wherein a width of the ledge extending from the lower edge of the front face of said housing is less than a width of the ledge extending from the lower edge of the other faces (1B,1C) of said housing.

7. The housing for an electronic module as claimed in claim 6, wherein the width of the ledge extending from the lower edge of the front face of said housing is zero.

8. The housing for an electronic module as claimed in claim 1, wherein the walls of the housing or the ledge extending from the lower edge of each face of said housing are sloped.

9. The housing for an electronic module as claimed in claim 1, wherein the ledge extending laterally from the lower edge of the lateral faces of said housing has a width that decreases in a direction of the rear face of said housing.

10. The housing for an electronic module as claimed in claim 1, wherein:
    the means for blocking the rotation of the electronic module comprises a ledge extending laterally from the lower edge of the lateral faces of said housing and having a width that decreases in the direction of the rear face of said housing, thus forming tabs near the front face of the housing;
    the means for pressing against the electronic module comprises the portion of ledge extending from the lower edge of the rear face of said housing.

11. An electronic module for an electronic unit for measuring operating parameters of a vehicle wheel, comprising a housing as claimed in claim 1 and enclosing, on the one hand, a printed circuit comprising the control electronics for the electronic unit and, on the other hand, a battery power supply, said printed circuit and said battery being arranged not coplanar but parallel, one above the other.

12. An electronic module for an electronic unit (20) for measuring operating parameters of a vehicle wheel, comprising a housing as claimed in claim 1 and enclosing, on the one hand, a printed circuit comprising the control electronics for the electronic unit and, on the other hand, a battery power supply, said printed circuit and said battery being arranged not coplanar but perpendicular to one another.

13. An electronic unit for measuring operating parameters of a vehicle wheel, comprising:
- an electronic module as claimed in claim 11,
- an inflation valve of the "snap-in" type, comprising:
  - a valve body made of an elastomer material, provided with a longitudinal axial bore and intended to extend through an orifice made in the rim, said valve body being made up of an elastically deformable trunk and of an abutment head for butting against the rim, which head is separated from the trunk by a neck designed to become positioned in airtight manner in the orifice made in said rim,
  - and a hollow tubular core made of a rigid material, housing a shut-off mechanism and of dimensions suited to being housed in the bore of the valve body and to extending on each side in the continuation of said valve body, said tubular core being made up of two longitudinal portions arranged with respect to one another and relative to the valve body in such a way as to allow the trunk elastic deformation suited to allowing the inflation valve to be mounted through the orifice in the rim, and means of joining the electronic module and the inflation valve.

14. A vehicle wheel comprising:
- a rim;
- a tire able to cover said rim in such a way as to delimit a chamber to accommodate the air with which said tire is inflated; and
- an electronic unit as claimed in claim 13.

15. The housing for an electronic module as claimed in claim 2, wherein the means for blocking rotation and the means for pressing against the electronic module comprises tabs extending from the corners of a lower edge of said housing, which is able to be positioned facing the rim.

16. The housing for an electronic module as claimed in claim 2, wherein the means for blocking rotation and the means for pressing against the electronic module comprises a ledge extending from a lower edge of said housing.

17. An electronic unit for measuring operating parameters of a vehicle wheel, comprising:
- an electronic module as claimed in claim 12,
- an inflation valve of the "snap-in" type, comprising:
  - a valve body made of an elastomer material, provided with a longitudinal axial bore and intended to extend through an orifice made in the rim, said valve body being made up of an elastically deformable trunk and of an abutment head for butting against the rim, which head is separated from the trunk by a neck designed to become positioned in airtight manner in the orifice made in said rim,
  - and a hollow tubular core made of a rigid material, housing a shut-off mechanism and of dimensions suited to being housed in the bore of the valve body and to extending on each side in the continuation of said valve body, said tubular core being made up of two longitudinal portions arranged with respect to one another and relative to the valve body in such a way as to allow the trunk elastic deformation suited to allowing the inflation valve to be mounted through the orifice in the rim,
- and means of joining the electronic module and the inflation valve.

18. A vehicle wheel comprising:
- a rim;
- a tire able to cover said rim in such a way as to delimit a chamber to accommodate the air with which said tire is inflated; and
- an electronic unit as claimed in claim 17.

19. The housing for an electronic module as claimed in claim 2, wherein the means for blocking the rotation of the electronic module comprises a widening of said housing at least in its portion on the side of the front face able to be positioned facing the inflation valve, and the means for pressing against the electronic module comprises a chamfered or rounded shape of said housing in the direction of its portion on the side of the rear face.

\* \* \* \* \*